United States Patent [19]
Damm

[11] Patent Number: 5,991,011
[45] Date of Patent: Nov. 23, 1999

[54] LASER DISTANCE FINDING APPARATUS

[75] Inventor: Hartmut Damm, Teningen, Germany

[73] Assignee: Sick AG, Walskirsch/Breisgau, Germany

[21] Appl. No.: 08/959,598

[22] Filed: Oct. 29, 1997

[30] Foreign Application Priority Data

Nov. 14, 1996 [DE] Germany .......................... 196 47 152

[51] Int. Cl.⁶ ................................................. G01C 3/08
[52] U.S. Cl. ........................................ 356/5.01; 356/5.13
[58] Field of Search ................................ 356/5.01, 5.12, 356/5.13

[56] References Cited

U.S. PATENT DOCUMENTS

| | | | |
|---|---|---|---|
| 3,619,058 | 11/1971 | Hewlett et al. | 356/5.12 |
| 3,728,025 | 4/1973 | Madigan et al. | 356/5.12 |
| 3,813,165 | 5/1974 | Hines et al. | 356/5.12 |
| 4,026,654 | 5/1977 | Beaurain . | |
| 4,576,481 | 3/1986 | Hansen . | |

FOREIGN PATENT DOCUMENTS

| | | |
|---|---|---|
| 0358868A2 | 3/1990 | European Pat. Off. . |
| 0368299A1 | 5/1990 | European Pat. Off. . |
| 1811540 | 8/1970 | Germany . |
| 2159950 | 6/1973 | Germany . |
| 2536878 | 2/1977 | Germany . |
| 2536903 | 2/1977 | Germany . |
| 3032325A1 | 4/1982 | Germany . |
| 6806691U1 | 5/1983 | Germany . |
| 3708883A1 | 9/1988 | Germany . |
| 4208189A1 | 4/1993 | Germany . |
| 4340756A1 | 6/1994 | Germany . |
| 4341080C1 | 2/1995 | Germany . |
| 4425285A1 | 1/1996 | Germany . |
| 361114176 | 5/1986 | Japan ..................................... 356/5.13 |

*Primary Examiner*—Stephen C. Buczinski
*Attorney, Agent, or Firm*—Townsend and Townsend and Crew LLP

[57] ABSTRACT

A laser range finding apparatus 10 comprises a pulsed laser 12, a light deflecting device 14, photo-receiver arrangement 16 and a reference object 18 arranged at a defined spacing from the light deflecting device 14. In this respect the reference object 18 has at least one triple element consisting of three mirror surfaces arranged at an angle of 90° to one another.

34 Claims, 4 Drawing Sheets

Figur 1

Figur 2

Figur 3

Figur 4

Figur 5

Figur 6

Figur 7

Figur 8

LASER DISTANCE FINDING APPARATUS

FIELD OF THE INVENTION

The invention relates to a laser range finding apparatus comprising a pulsed laser, a light deflecting device, a photo-receiver arrangement and a reference object arranged at a defined spacing from the light deflecting device. It relates to a reference object for such a laser range finding apparatus.

DESCRIPTION OF PRIOR ART

In a laser range finding apparatus of the initially named kind, light pulses reflected back from an object located in a measurement region are received by the photo-receiver arrangement in order to then find a scanning signal representative for the distance of the object from the light deflecting device from the time between the transmission and receipt of a light pulse taking account of the speed of light, in accordance with the pulse transit time method. As a result of the signal dynamics, transit time measurement errors can, however, arise. These are to be attributed, amongst other things, to the fact that the level of the respectively received light pulse must exceed a specific switching threshold before the respectively used time measuring unit is stopped, and to the fact that the time at which the threshold is exceeded is dependent on the steepness of the flank of the received light pulse, which in particular again depends on the respective pulse amplitude. For the compensation of the transit time measurement error one can, for example, measure the amplitude of the received light pulse and take a corresponding correction value from a previously established correction table. A correction table of this kind can be put together using the reference object after this has been arranged at a defined spacing from the light deflecting device.

In a laser radar known from DE 43 40 756 A1, in which the compensation of the transit time measurement error, which has occurred as a result of the signal dynamics, takes place in dependence on the measured peak value of the received light pulse, only a specific amplitude can be simulated by the reference object that is used. A further disadvantage lies in the fact that, with the use of a scattering reference object, its distance from the optical receiving system is relatively small. A parallel incidence of the light which is to be received by the photo-receiver arrangement is thus not possible so that it is also not possible to simulate a reference object lying at infinity. Since the reference object is as a rule to be integrated into the apparatus, the distance to the optical receiving system is approximately the same as one to three times the focal length of this optical receiving system. Moreover, with optical systems operating with auto-collimation with a central shadow, no direct beam path is possible through the optical receiving system back to the receiving arrangement. The light first passes back to the receiver after multiple scattering occurring in the tube between the optical receiving system and the receiver. The path length covered by the light is thus practically undefined. As a consequence, a precise calibration of the measurement system is also not possible.

In an optical scanning apparatus known from DE 43 41 080 C1, a reference object is provided with two conical mirror surfaces standing at an angle of 90° to one another. These are arranged concentrically about a mirror wheel serving as a deflecting device. The light beam originating from the transmitter is turned around through 90° twice and displaced parallel to itself in order to avoid the central shadowing of the auto-collimation optical system that is provided. The attenuation of the light beam is brought about by diaphragms arranged in front of or between the surfaces. One of the surfaces can be formed as a partial surface. It is always the case that only a certain portion of the light is coupled back through geometrical division. This has, however, the consequence that, when using laser diodes as light transmitters, so-called mode noise arises. In laser diodes the radiated energy from one pulse to the next has a different direction of propagation. Moreover, the temporal behavior between the electrical current pulse through the laser diode and the transmitted light pulse is different for the different modes of propagation. Thus, precise calibration and correction is not possible in the centimeter and millimeter range so that the measurement accuracy is restricted. A further disadvantage lies in the fact that the conical surfaces act like a concave mirror in the direction of deflection of the mirror wheel. Thus, an intermediate image arises between the reference object and the mirror wheel. This intermediate image is again produced in a region between one and three times the focal length of the optical receiving system. It is thus imaged by the optical receiving system behind this optical system at a distance which corresponds approximately to 1.5 times the focal length. As a result, a relatively small part of the light is deflected onto the receiver. Thus, in particular, the possibility also of simulating the maximum over-modulation of the receiver does not exist. Moreover, the light rays, which are not directly incident onto the receiver, are multiply reflected in the tube receiving the optical system, which again leads to faulty measured values.

The reference object must, moreover, be very accurately adjusted as a result of the use of two mirror surfaces arranged at 90° to one another. In the cases in which a part of the beam cross-section is blended out by the use of an aperture diaphragm, no complete mode mixing can be achieved.

OBJECT OF THE INVENTION

The object of the invention is to provide a laser range finding apparatus, and also a reference object of the initially named kind, which at minimum expense and complexity ensure a high accuracy of the reference measurements and thus a compensation of the transit time measurement errors resulting from the signal dynamics which is as ideal as possible.

BRIEF DESCRIPTION OF THE INVENTION

The object is satisfied in accordance with the invention in that the reference object includes at least one triple element comprising three mirror surfaces arranged at an angle of 90° to one another.

As a result of this design, a situation is first achieved in which the light originating from the pulsed laser is reflected back and displaced parallel to itself, without any form of intermediate image being thereby produced. The triple element consisting of three mirror surfaces arranged at an angle of 90° to one another represents a type of negative form of a triple reflector. The light originating from the reference object and received by the photoreceiving arrangement can now be at parallel incidence so that a reference object lying at infinity is simulated. The beams received from the reference object can thus be directly focused onto the photo-receiver that is used.

The reference light beam coming from infinity thus brings with it the advantage of a sharp image at the focal point.

Moreover, the optical wavelength within the triple element is independent of the angle of incidence and also independent of the position of incidence of the transmitted pulsed light beam originating from the pulsed laser. Accordingly, the resulting optical path length between the pulsed laser and the photo-receiver arrangement is independent of the angle of incidence and of the location of incidence. The parallel displacement of the light rays depends only on the position of incidence and the size of the at least one triple element. If the parallel displacement is not to be too large, and if it is to be ensured that all the light rays originating from the reference object are also received in the photo-receiver arrangement, then the reference object may not exceed a specific size. A precise adjustment is no longer necessary, other than in the case when using a reference object with only two mirror surfaces arranged at an angle of 90° to one another.

For the reference object in accordance with the invention, the light is always precisely reflected back on itself to where it came from after a parallel displacement.

In order to be able to carry out as many reference measurements as possible over the largest possible angular range of a photo-receiver arrangement, the reference object preferably includes a plurality of triple elements which lie on a circular arc concentric to the axis rotation of a rotatable light deflection unit. With a multiple concave triple the inwardly disposed corner points should in particular lie on such a circular arc concentric to the axis of rotation of the light deflecting device.

In accordance with an embodiment which is particularly simple to manufacture, the reference object is formed by an injection molded plastic body with correspondingly mirrored surfaces. If required, a plurality of triple elements can thus be combined into such an injection molded part.

In the embodiment which is preferred in practice the reference object is so arranged and designed that a pulsed beam transmitted from the pulsed laser and deflected by the light deflecting device onto the reference object is displaced parallel to itself out of the central shadow of the optical transmitting system and reflected back while maintaining its total cross-section. Since the total cross-section of the transmitted light is also received again, the desired full mode mixing is achieved.

In order to achieve the most complete mode mixing possible, the pulsed light beam incident onto the reference object and reflected back by the latter is preferably energetically attenuated. Thus a geometrical division is preferably dispensed with in order to avoid mode noise.

In the embodiment which is preferred in practice the reference object which is preferably arranged outside of a defined monitored angular scanning range is swept over by a pulsed light beam which is deflected with continuously changing angles.

In order to be able to reproduce the largest possible number of amplitudes, provision is advantageously made for the degree of attenuation to change in the scanning direction. With a light entry surface and a light exit surface extending along a circular arc concentric to the axis of rotation of a rotatable light deflecting device the degree of attenuation preferably changes along this circular arc. The pulsed light beam thus experiences a differential attenuation during its scanning movement sweeping over the reference object so that in particular different amplitudes are reproduced and different transit time measurement errors can accordingly be compensated.

It is of particular advantage when the degree of attenuation in the scanning direction along the circular arc changes continuously. Thus it is basically possible to reproduce all the amplitudes which occur in practice during a respective range measurement so that a precise compensation of the respective transit time measurement error is ensured via the correspondingly established correction tables or correction functions.

In an embodiment preferred in practice the reference object is provided with at least one attenuating filter. This is preferably arranged in front of the at least one triple element when considered in the direction of propagation of the incident transmitted pulsed light beam and is expediently provided in the region of the light entry surface and the light exit surface of the reference object.

This attenuating filter can in turn extend, in accordance with the light entry surface and the light exit surface of the reference object, along a circular arc concentric to the axis of rotation of the rotatable light deflecting device.

In the embodiment preferred in practice the attenuating filter is expediently a wavelength independent absorption filter. The advantage of absorption lies in the fact that the light is energetically attenuated and not geometrically divided. In this way the problem of mode noise is avoided.

In order to obtain as many intermediate values as possible between a minimal received level and a maximum received level the attenuating filter is advantageously formed as a course filter having a continuously changing optical attenuation in the direction of scanning, i.e. along the circular arc. Thus different degrees of attenuation result for different angular positions of a rotatable photo-receiver arrangement.

In this connection the attenuating filter advantageously has an attenuating characteristic ranging from an optical density D=0 to in particular D=4 and preferably from D=0 to D=3.7, with the density values being quoted for a single pass through the filter. With the embodiment preferred in practice, with both the incident light as well as the emergent light passing through the attenuating filter associated with the reference object, the filter then preferably has a total attenuating characteristic ranging from D=0 to in particular D=8 and in particular from D=0 to D=7.4. Thus both the incident light and also the emergent light are attenuated by the attenuating filter with the two attenuation values being of the same size.

The attenuating filter can advantageously be formed as a foil filter. This can if desired be curved concentric to the axis of rotation of the photoreceiver arrangement.

It is a particular advantage when the reference object is provided with positioning means and/or fixing means in order to position and/or to fix the attenuating filter to the reference object.

The respective degree of attenuation can however at least partly be determined by a correspondingly reduced reflectivity of at least one mirror surface of a respective triple element, and the respective mirror surface can for example also be roughened.

Further advantageous variants of the laser range finding apparatus of the invention and of the reference object of the invention are set forth in the subordinate claims.

As a result of the invention it is thus in particular possible to simulate all the signal amplitudes of interest in practice from the smallest detectable amplitude up to the largest amplitude leading to a maximum overmodulation of the receiver connected after the photo-receiver arrangement. It is also important that the optical path length from the transmitter via the optical transmitting system and the light deflecting device, which for example contains a mirror wheel, to the reference object, and back via the light deflecting device and the optical receiving system to the receiver, is independent from the simulated amplitude of the received signal. The simulation which takes place using the reference object also takes place at a known and constant optical path length. As a result, very precise correction tables and/or functions can be established and can also be continuously re-calibrated in dependence on the signal amplitude. With the aid of a corresponding correction table or correction function the range of the respective object can then be measured precisely and practically independent of the respective reflective behavior. The triple element can in particular also be designed as a concave triple or a multiple concave triple in which no reflection occurs. When using a plurality of triple elements arranged concentric to the axis of rotation of the photo-receiver arrangement it is ensured that no intermediate image arises. A precise adjustment of the triple arrangement is not necessary.

BRIEF LISTING OF THE FIGURES

The invention will be explained in more detail with reference to examples and the following drawings.

DESCRIPTION OF PREFERRED EMBODIMENTS

Figure 1:
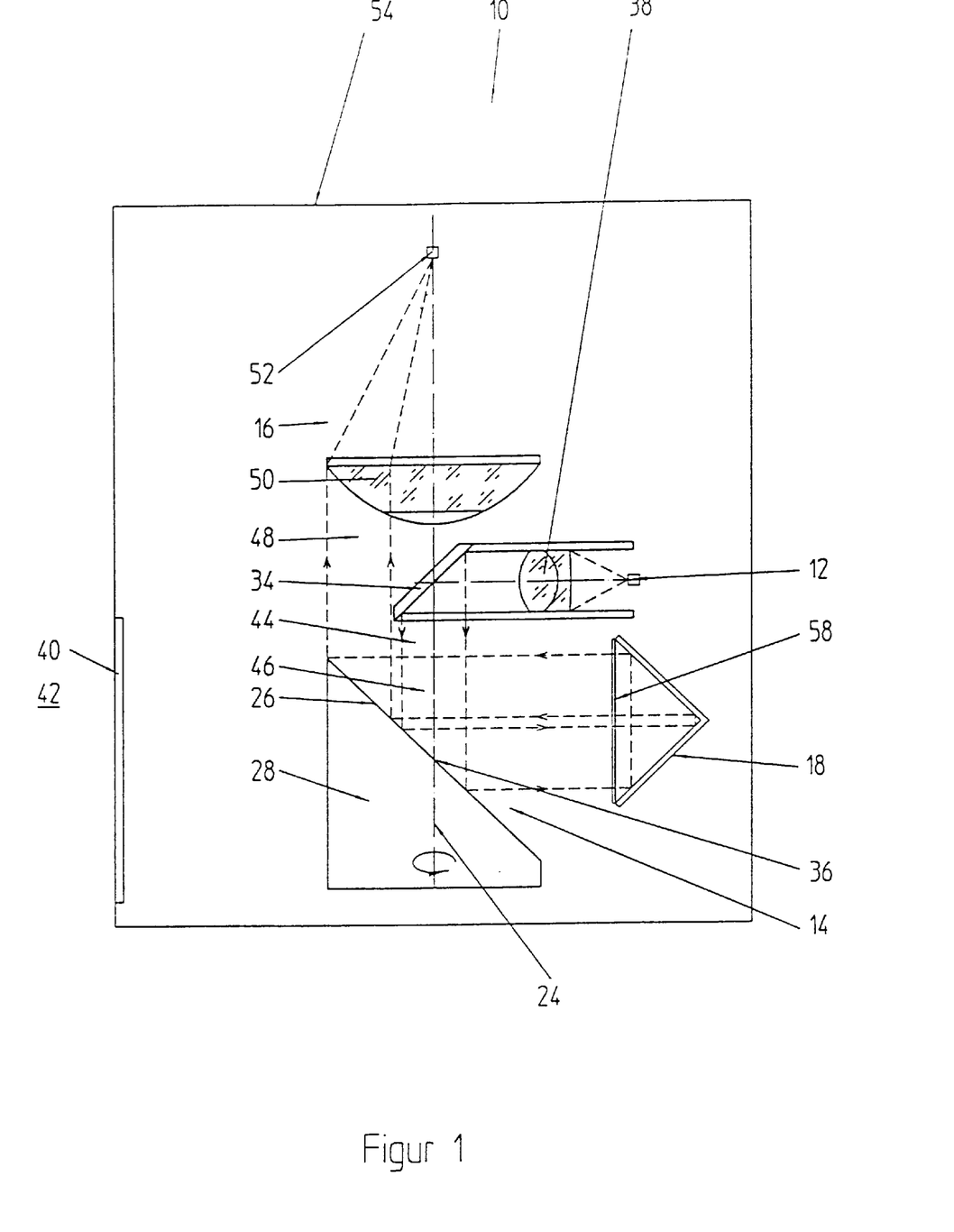
FIG. 1 is a schematic view of the basic design of a laser range finding apparatus which has been realized as a laser radar.
Figure 2:
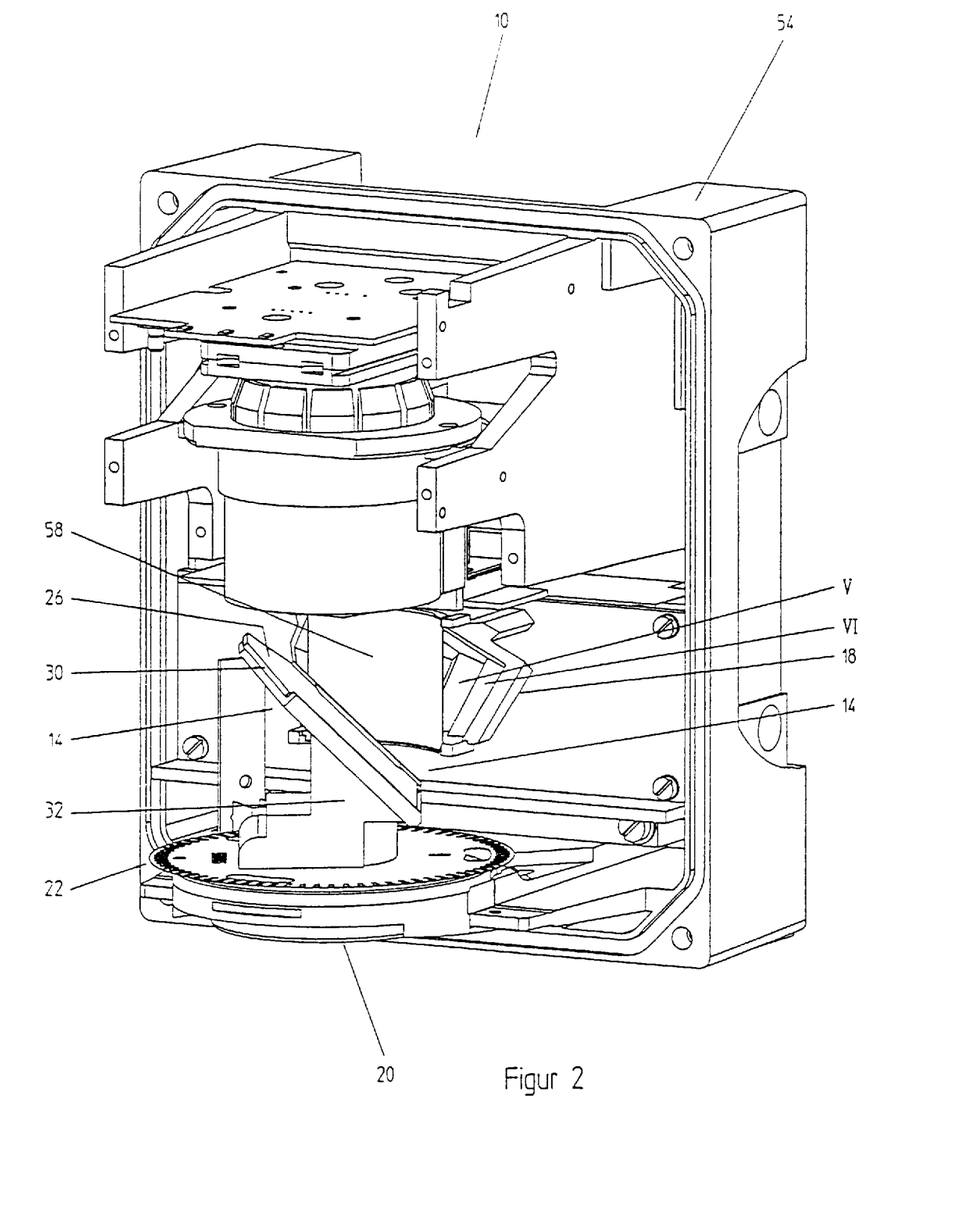
FIG. 2 shows a practical embodiment of such a laser range finding apparatus.

In accordance with the basic layout which can be seen from the FIGS. 1 and 2, the laser range finding apparatus 10 includes a pulsed laser 12, a light deflecting device 14, a photo-receiver arrangement 16 and a reference object 18 arranged at a defined distance from the light deflecting device 14.

A motor 20 (see FIG. 2) drives a horizontal rotating plate 22 to execute a continuous rotating movement about a vertical axis 24 (see FIG. 1). An angle sensor formed, for example, as a forked light barrier can be provided at the periphery of the rotatable plate 22 and connected to an electronic control and evaluation circuit.

The light deflecting device 14 includes a rotary mirror 26 which can be formed by the upper end face of a right cylindrical body 28 (see FIG. 1) or also at a mirror plate 30 (see FIG. 2). In accordance with FIG. 2, the mirror plate 30 is secured to the rotary plate 22 via a mirror carrier 32.

Above the rotary mirror 26 there is arranged a likewise planar deflecting mirror 34 which is of substantially narrower design and the mirror surface of which has an angle of 45° to the axis of rotation 24. The mirror 34 can, for example, in turn be formed as a right cylindrical body or as a flat mirror plate.

A central region 36 of the rotary mirror 26 receives light from the pulsed laser 22 via a transmitting lens 38. The initially horizontal light beam is deflected downwardly at the deflecting mirror 34 in order to then be deflected from the rotary mirror 26 in the horizontal direction.

In FIG. 1 the rotary mirror 26 has a rotary position such that the light is directed onto the reference object 18. In contrast, the rotary mirror is so aligned during each range measurement that the light is directed through a front plate 40 into a measurement region 42. If now an object of which the range is to be determined is located in this measurement region 42, then, as a rule, scattered light will pass from this object through the front disc 40 back to the rotary mirror 26 in the sense of an auto-collimation beam path.

Whereas the centrally incident light beam 46 of the transmitted pulsed light beam 44 is incident onto the central region 36 of the rotary mirror 26, and is deflected from there in the horizontal direction, the received pulsed light beam 48 originating from an object located in the measurement region 42 from the reference object 18 passes via the same rotary mirror 26 to a receiving lens 50, through which the received light is concentrated onto a photo-receiver 52.

The rotary mirror 26, the rotary plate 22 and the motor 20 are part of the light deflecting device 14, which permits the transmitted pulsed light beam 44 and the received pulsed light beam 48 to rotate around the axis of rotation 24.

The reference object 18 is integrated in the housing 54 of the laser range finding apparatus 10.

As can be seen in particular from FIGS. 3 to 8, the reference object 18 includes a plurality of triple elements, in the present case six triple elements I–VI, each consisting of three mirror surfaces $I_1$–$VI_6$, arranged at an angle α, β of 90° to one another.

The triple elements I–VI are respectively formed as a concave triple. In the installed state of the reference object 18 (see in particular FIG. 2) they are each formed by two downwardly disposed mirror surfaces and an upwardly disposed mirror surface.

Figure 6:
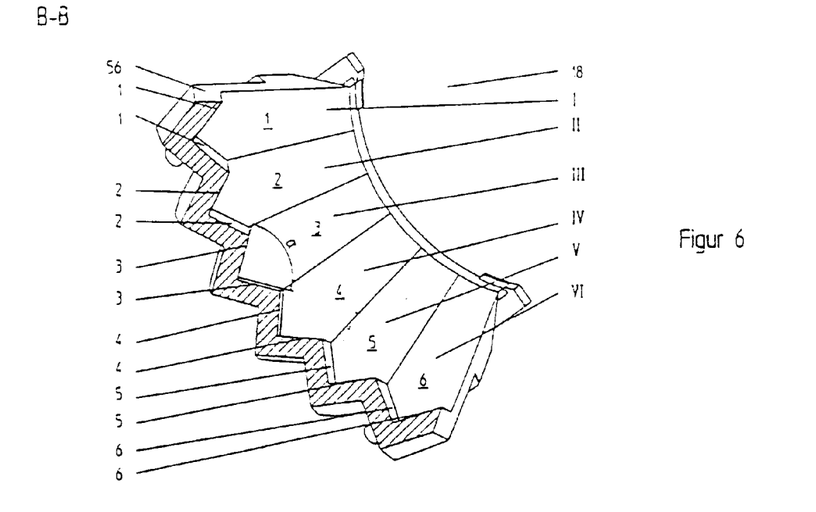
FIG. 6 is a sectional view of the reference object sectioned along the line B—B in FIG. 5.
Figure 7:
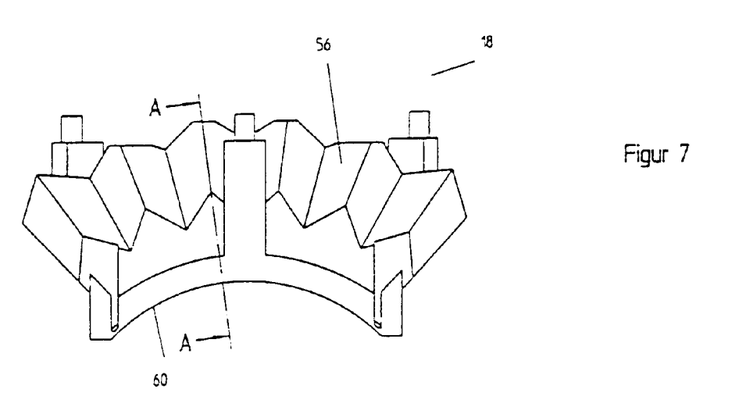
FIG. 7 is a view of the reference object from below.
Figure 8:
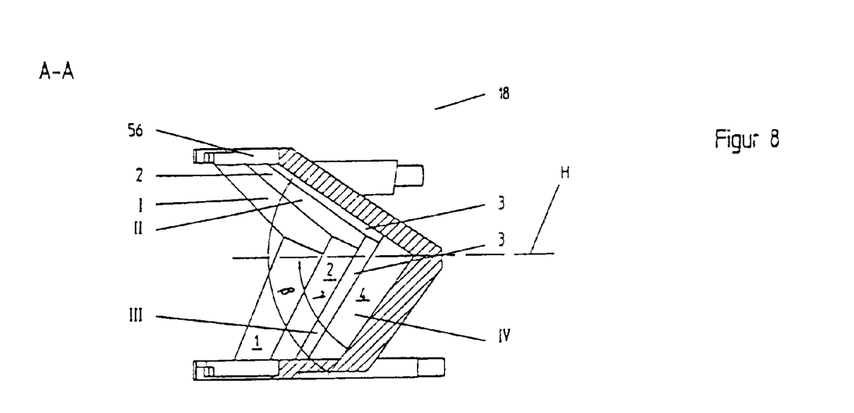
FIG. 8 is a sectioned view of the reference object sectioned along the line A—A in FIG. 7.

The angle formed between the two lower mirror surfaces of the respective triple element is designated by α in FIG. 6. In FIG. 8, the angle between the upper mirror surface and a lower mirror surface of a respective triple element is designated by β. The same angle β is also present between the upper mirror surface and the other lower mirror surface. These two angles α and β amount in each case to 90° for all the triple elements I–VI. Moreover, it can be deduced from FIG. 8 that in the present case the lower mirror surfaces each include an angle γ of approximately 55° with the horizontal H.

The six triple elements I–VI of the reference object 18 lie on a circular arc concentric to the axis of rotation 24 (see FIG. 1) of the rotatable light deflecting device 14, with the arrangement being so designed that the inwardly disposed corner points P, each formed by the point of intersection of the relevant three mirror surfaces (see in particular FIG. 4) of the reference object 18 formed as a multiple concave triple, are arranged on a circular arc of this kind concentric to the axis of rotation 24.

In the present case the reference object 18 is formed by an injection molded plastic body 56 with correspondingly mirrored surfaces. Thus, all six triple elements I–VI are combined into a single such plastic body.

As can best be seen with reference to FIG. 1, the reference object 18 is so arranged and designed that a pulsed light beam 44 transmitted by the pulsed laser 12 through the light deflecting device 14 and deflected onto the reference object 18 is displaced parallel to itself out of the central shadow of the optical transmitting system and is reflected back on itself while maintaining its total cross-section. In this way the reference object 18 arranged outside of the defined monitored angular scanning range, i.e. outside of the measurement region 42, is swept over by the transmitted pulsed light beam 44, which is deflected with continuously changing angles.

The pulsed light beam 44, 48, which is incident onto the reference object 18, and is reflected by the latter, is energetically attenuated, with the degree of attenuation continuously changing in the scanning direction.

For this purpose the reference object 18 is provided with an attenuating filter 58 which is arranged in front of the triple elements I–VI when considered in the direction of propagation of the incident transmitted pulsed light beam 44. In the present case this attenuating filter 58 is arranged in the region of the light inlet surface and light exit surface of the reference object 18 formed as a multiple concave triple (see FIGS. 1 and 2). In correspondence with the light entry surface and light outlet surface of the reference object 18, the attenuating filter 58 extends along a circular arc concentric to the axis of rotation 24 of the rotatable light deflecting device 14.

In the present case the attenuating filter 58 is a wavelength, independent absorption filter, which is in turn formed as a course filter, having an optical attenuation which continuously changes in the scanning direction or along the circular arc concentric to the axis of rotation 24.

In the present embodiment, the attenuating filter 58 is provided with an attenuation characteristic which ranges from an optical density D=0 to in particular D=4 and preferably from D=0 to D=3.7, with these density values being given for a single passage through the filter. In the present case the attenuating filter 58 associated with the reference object 18 is passed through both by the incident light beam and also by the emergent light so that it has a total attenuation characteristic ranging from an optical total density D=0 to in particular D=8 and preferably from D=0 to D=7.4. Moreover, the attenuating filter 58 is formed in the present case as a foil filter.

Figure 3:
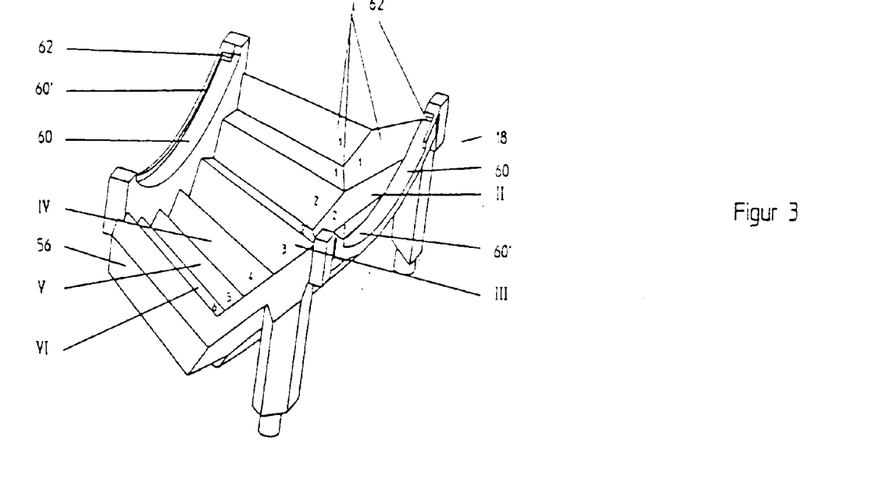
FIG. 3 is a perspective view of a reference object used in the laser range finding apparatus of FIGS. 1 and 2.
Figure 4:
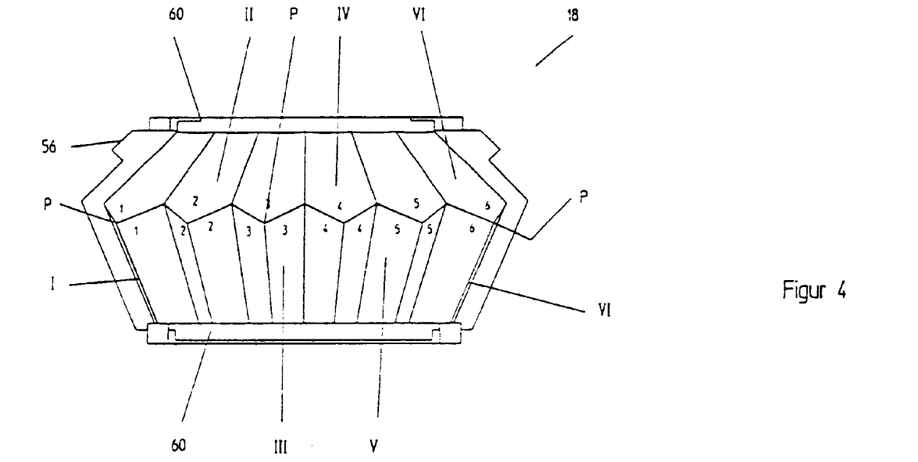
FIG. 4 is a front view of the reference object shown in FIG. 3 in the direction of the incident light.
Figure 5:
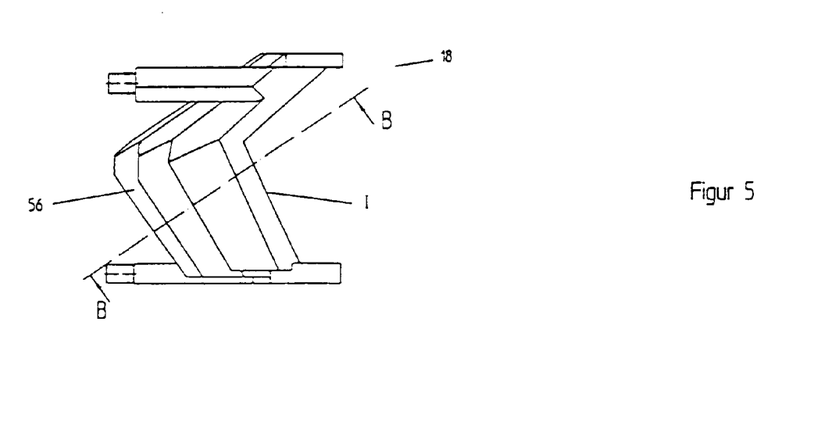
FIG. 5 is a side view of the reference object.

As can in particular be recognized with respect to FIGS. 3 and 4, the reference object 18 is provided with positioning means and fixing means 60 in order to respectively position and fix the attenuating filter 58 at the reference object 18. These positioning and fixing means 60 include a contact edge 60', against which the foil-like attenuating filter 58 can be brought into engagement while producing the required curvature concentric to the axis of rotation 24. The contact edge 60', and at its ends follows a circular arc concentric to the axis of rotation 24, these positioning and fixing means 60 are provided with clamping means 62 (see in particular FIG. 3), to which the ends of the foil-like attenuating filter 58 can be fixedly clamped.

As can in particular be recognized from FIG. 1, the light reflected back from the reference object 18 to the light deflecting device 14 strikes in parallel onto the receiving lens 50 so that a reference object 18 lying at infinity is simulated. In this manner a sharp image is produced at the focal point. Since the total cross-section of the transmitted pulsed light beam is also fully received again, a complete mode mixing is achieved. Despite the course of the reference object along a circular arc concentric to the axis of rotation 24 of the light deflecting device 14, no form of intermediate image arises. A precise adjustment of the reference object 18 is no longer necessary. The light is displaced parallel to itself by the reference object 18 and is always reflected back precisely to the point from which it originated. Through a corresponding graduation of the foil-like attenuating filter 58, the whole dynamic range can basically be covered. Since both the incident light and also the emergent light pass through the attenuating filter 58 associated with the reference object 18, a double attenuation results. Finally, extremely precise correction tables and/or correction functions, which are moreover also later adjustable, can be produced by corresponding reference measurements.

What is claimed is:

1. Laser range finding apparatus (10) comprising a pulsed laser (12) emitting a pulsed, energetically attenuated light beam, a light deflection device (14), a photo-receiver arrangement (16) and a reference object (18) arranged at a defined spacing from the light deflecting device (14), the reference object (18) including at least one triple element (I–VI) having three mirror surfaces ($I_1$–$VI_6$) arranged at an angle ($\alpha$, $\beta$) of 90° to one another, a degree of attenuation of the light beam changing in a direction of scanning of the light beam.

2. Laser range finding apparatus in accordance with claim 1 wherein the reference object (18) includes a plurality of triple elements (I–VI) which lie on a circular arc concentric to an axis of rotation (24) of the rotatable light deflecting device (14).

3. Laser range finding apparatus in accordance with claim 1 wherein the reference object (18) is formed by an injection molded plastic body (56) with correspondingly mirrored surfaces.

4. Laser range finding apparatus in accordance with claim 1 wherein the reference object (18) is so arranged and designed that a pulsed light beam (44) transmitted by the pulsed laser (12) and deflected by the light deflecting device (14) onto the reference object (18) is displaced parallel to itself out of a central shadow of the pulsed light beam and is reflected back while maintaining its total cross-section.

5. Laser range finding apparatus in accordance with claim 1 including means for deflecting the pulsed light beam and scanning it at continuously changing angles over the reference object (18) which is arranged outside of a defined, monitored angular scanning range (42).

6. Laser range finding apparatus in accordance with claim 1 wherein the light deflecting device (14) is rotatable about an axis of rotation (24) and the reference object has a light entry surface and a light exit surface extending along a circular arc concentric to the axis of rotation (24) of the rotatable light deflecting device (14), and wherein the degree of attenuation changes along the circular arc.

7. Laser range finding apparatus in accordance with claim 6 wherein the degree of attenuation is continuously stepped along the circular arc.

8. Laser range finding apparatus in accordance with claim 1 wherein the reference object (18) is provided with at least one attenuating filter (58).

9. Laser range finding apparatus in accordance with claim 8 wherein the attenuating filter (58) is arranged, when considered in a direction of propagation of an incident transmitted pulsed light beam (44), in front of the at least one triple element (I–VI).

10. Laser range finding apparatus in accordance with claim 9 wherein the reference object includes a light entry surface and a light exit surface, and wherein the attenuating filter (58) is arranged in a region of the light entry surface and light exit surface of the reference object (18).

11. Laser range finding apparatus in accordance with claim 8 wherein the light deflecting device (14) is rotatable about an axis of rotation (24) and the attenuating filter (58)

extends in accordance with a light entry surface and a light exit surface of the reference object (18) along a circular arc concentric to an axis of rotation (24) of the rotatable light deflecting device (14).

12. Laser range finding apparatus in accordance with claim 1 including an attenuating filter (58) associated with the reference object and comprising a wavelength independent absorption filter.

13. Laser range finding apparatus in accordance with claim 1 including an attenuating filter (58) formed as a course filter having a continuously changing optical attenuation in the scanning direction.

14. Laser range finding apparatus in accordance with claim 13 wherein the attenuating filter (58) has an attenuation characteristic having an optical density of D=0 to D=4, a density values being given for a single passage through the filter.

15. Laser range finding apparatus in accordance with claim 1 including an attenuating filter (58) associated with the reference object, and wherein both incident light and emergent light pass through the attenuating filter (58) and the attenuating filter (58) has a total attenuation characteristic ranging from an optical density D=0 to D=8.

16. Laser range finding apparatus in accordance with claim 1 including an attenuating filter (58) associated with the reference object and formed as a foil filter.

17. Laser range finding apparatus in accordance with claim 1 wherein the degree of attenuation is determined at least in part by a correspondingly reduced reflectivity of at least one mirror surface ($I_1$–$VI_6$) of a triple element (I–VI).

18. Laser range finding apparatus in accordance with claim 17 wherein the at least one mirror surface ($I_1$–$VI_6$) is roughened.

19. Laser range finding apparatus in accordance with claim 1 including an attenuating filter associated with the reference object, and wherein the reference object (18) is provided with positioning and/or fixing means (60) for positioning and/or fixing the attenuating filter (58) at the reference object (18).

20. Laser range finding apparatus in accordance with claim 1 wherein the reference object includes a plurality of triple elements (I–VI) arranged alongside one another on a circular arc.

21. Laser range finding apparatus in accordance with claim 1 wherein the reference object comprises an injection molded plastic body (56) with correspondingly mirrored surfaces.

22. Laser range finding apparatus in accordance with claim 1 including means (58) for energetically attenuating light.

23. Laser range finding apparatus in accordance with claim 22 wherein the means for attenuating comprises at least one attenuating filter (58) arranged in front of the at least one triple element (I–VI) when considered in the direction of propagation of the incident transmitted pulsed light beam.

24. Laser range finding apparatus in accordance with claim 1 wherein the degree of attenuation changes continuously in the scanning direction.

25. Laser range finding apparatus in accordance with claim 14 wherein the attenuation characteristic of the attenuating filter has an optical density D=0 to D=3.7.

26. Laser range finding apparatus in accordance with claim 15 wherein the attenuating filter has a total attenuation characteristic ranging from an optical density D=0 to D=7.4.

27. Laser range finding apparatus (10) comprising a pulsed laser (12) for producing a pulsed light beam (44, 48), a rotatable light deflection device (14), a photo-receiver arrangement (16) and a reference object (18) arranged at a defined spacing from the light deflecting device (14), the reference object (18) including a plurality of triple elements (I–VI), which lie on a circular arc concentric to an axis of rotation (24) of the rotatable light deflecting device (14), each of said triple elements (I–VI) having three mirror surfaces ($I_1$–$VI_6$) arranged at an angle ($\alpha$, $\beta$) of 90° to one another, the pulsed light beam (44, 48) being incident on and reflected back by the reference object (18) and energetically attenuated, a degree of attenuation changing in a direction of scanning of the pulse light beam.

28. Laser range finding apparatus (10) comprising a pulsed laser (12) for producing a pulsed light beam (44, 48), a rotatable light deflection device (14), a photo-receiver arrangement (16) and a reference object (18) arranged at a defined spacing from the light deflecting device (14), the reference object (18) including a plurality of triple elements (I–VI), which lie on a first circular arc concentric to an axis of rotation (24) of the rotatable light deflecting device (14), each of said triple elements (I–VI) having first, second and third mirror surfaces ($I_1$–$VI_6$) arranged at an angle ($\alpha$, $\beta$) of 90° to one another, the reference object further having a light entry surface and a light exit surface extending along a second circular arc concentric to the axis of rotation (24), the degree of attenuation changing along the second circular arc, the pulsed light beam (44, 48) being incident on and reflected back by the reference object (18) and energetically attenuated, a degree of attenuation changing along the second circular arc.

29. Laser range finding apparatus (10) comprising a pulsed laser (12), a light deflection device (14), a photo-receiver arrangement (16) and a reference object (18) arranged at a defined spacing from the light deflecting device (14), the reference object (18) including a plurality of triple elements (I–VI) arranged alongside one another on a circular arc and having first, second and third mirror surfaces ($I_1$–$VI_6$) arranged at an angle ($\alpha$, $\beta$) of 90° to one another.

30. Laser range finding apparatus in accordance with claim 29 wherein the pulsed light beam (44, 48), which is incident onto the reference object (18) and reflected back from the latter, is energetically attenuated.

31. Laser range finding apparatus in accordance with claim 30 wherein the degree of attenuation changes in the direction of scanning.

32. Laser range finding apparatus (10) comprising a pulsed laser (12) that emits a light beam, a light deflection device (14), a photo-receiver arrangement (16) and a reference object (18) defined by an injection molded plastic body (56) and arranged at a defined spacing from the light deflecting device, the plastic body including at least one triple element (I–VI) having first, second and third mirrored surfaces ($I_1$–$VI_6$) arranged at an angle ($\alpha$, $\beta$) of 90° to one another, a degree of attenuation of the light beam changing in a direction of scanning of the light beam.

33. Laser range finding apparatus (10) comprising a pulsed laser (12) that emits a light beam, a light deflection device (14), a photo-receiver arrangement (16), a reference object (18) arranged at a defined spacing from the light deflecting device (14) and including at least one triple element (I–VI) having first, second and third mirror surfaces ($I_1$–$VI_6$) arranged at an angle ($\alpha$, $\beta$) of 90° to one another, and an attenuating filter (58) formed as a foil filter, a degree of attenuation of the light beam changing in a direction of scanning of the light beam.

34. Laser range finding apparatus (10) comprising a pulsed laser (12) emitting a light beam, a light deflection device (14), a photo-receiver arrangement (16) and a reference object (18) arranged at a defined spacing from the light deflecting device (14), the reference object (18) including at least one triple element (I–VI) having first, second and third mirror surfaces ($I_1$–$VI_6$) arranged at an angle ($\alpha$, $\beta$) of 90° to one another, at least one mirror surface ($I_1$–$VI_6$) of a respective triple element (I–VI) having a reduced reflectivity to therewith at least partly attenuate a light beam, a degree of attenuation of the light beam changing in a direction of scanning of the light beam.

* * * * *